United States Patent [19]

Bethe

[11] 4,174,415
[45] Nov. 13, 1979

[54] NO-GEL LATEX FOAM MATERIAL AND ITS PREPARATION

[75] Inventor: Eugene J. Bethe, Mishawaka, Ind.

[73] Assignee: Uniroyal, Inc., New York, N.Y.

[21] Appl. No.: 627,153

[22] Filed: Oct. 29, 1975

[51] Int. Cl.² ............................................. B29D 27/04
[52] U.S. Cl. ................................... 428/90; 264/45.8; 264/46.4; 264/135; 427/206; 428/310
[58] Field of Search ...................... 264/45.3, 46.4, 48, 264/45.8, 135; 427/203, 206; 260/723, 23 AR; 428/90, 310

[56] References Cited

U.S. PATENT DOCUMENTS

| | | | |
|---|---|---|---|
| Re. 27,366 | 5/1972 | Dunn | 260/23 AR X |
| 2,706,183 | 4/1955 | Carter | 260/723 X |
| 2,893,063 | 7/1959 | Hoppe | 264/45.3 |
| 2,948,651 | 8/1960 | Waag | 264/46.4 X |
| 3,175,257 | 3/1965 | Kessler | 264/45.3 X |
| 3,190,137 | 6/1965 | Adams | 428/90 X |
| 3,206,343 | 9/1965 | McFarlane | 264/45.3 X |
| 3,243,491 | 3/1966 | Bethe | 264/48 X |
| 3,305,991 | 2/1967 | Weismann | 264/45.8 X |
| 3,357,848 | 12/1967 | Donahue et al. | 427/203 |
| 3,492,192 | 1/1970 | Bullard | 264/45.3 X |
| 3,700,516 | 10/1972 | Sullivan | 264/45.3 X |
| 3,749,629 | 7/1973 | Andrews et al. | 427/203 X |
| 3,923,938 | 12/1975 | Pope | 427/206 X |
| 4,102,808 | 7/1978 | Straka | 428/310 X |

FOREIGN PATENT DOCUMENTS

| | | | |
|---|---|---|---|
| 570891 | 2/1959 | Canada | 264/45.3 |
| 861466 | 1/1971 | Canada | 264/46.6 |
| 2113002 | 9/1971 | Fed. Rep. of Germany | 427/206 |

*Primary Examiner*—Philip Anderson
*Attorney, Agent, or Firm*—Philip Rodman

[57] ABSTRACT

A no-gel latex foam is formed by curing a no-gel latex foam froth on a water vapor permeable foraminous support that has been coated with a flock. During curing, the foam froth dehydrates through an upper free surface and at its lower supported surface through the flock and the foraminous supporting means. When the cured foam is removed from the foraminous supporting means, a portion of the flock adheres to the foam undersurface and another portion of the flock is left as a residue.

27 Claims, 16 Drawing Figures

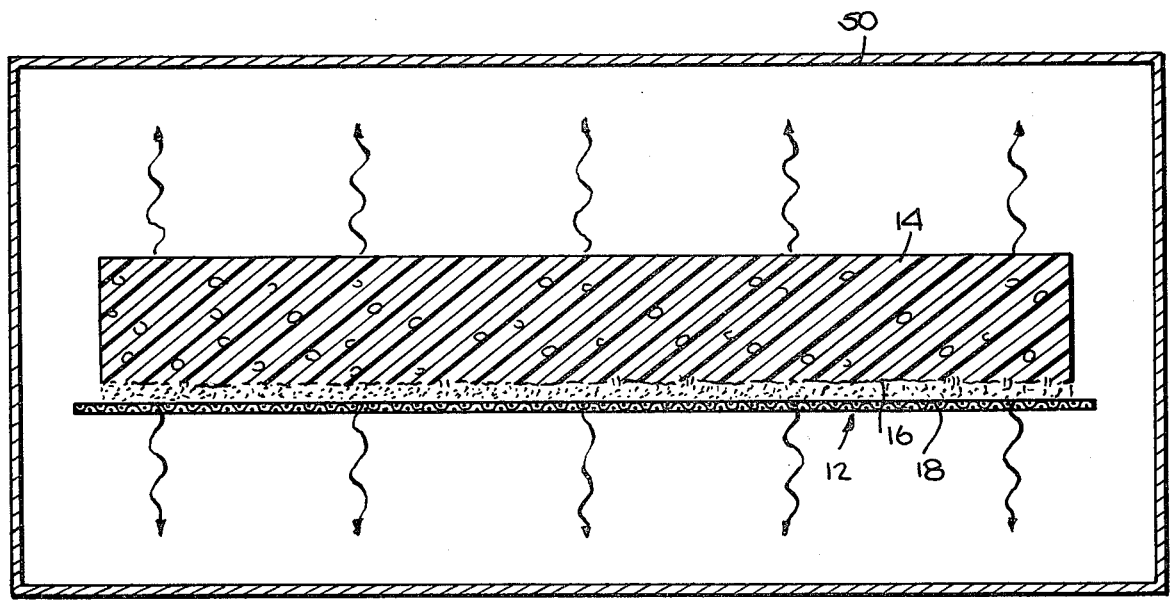
Fig.6.
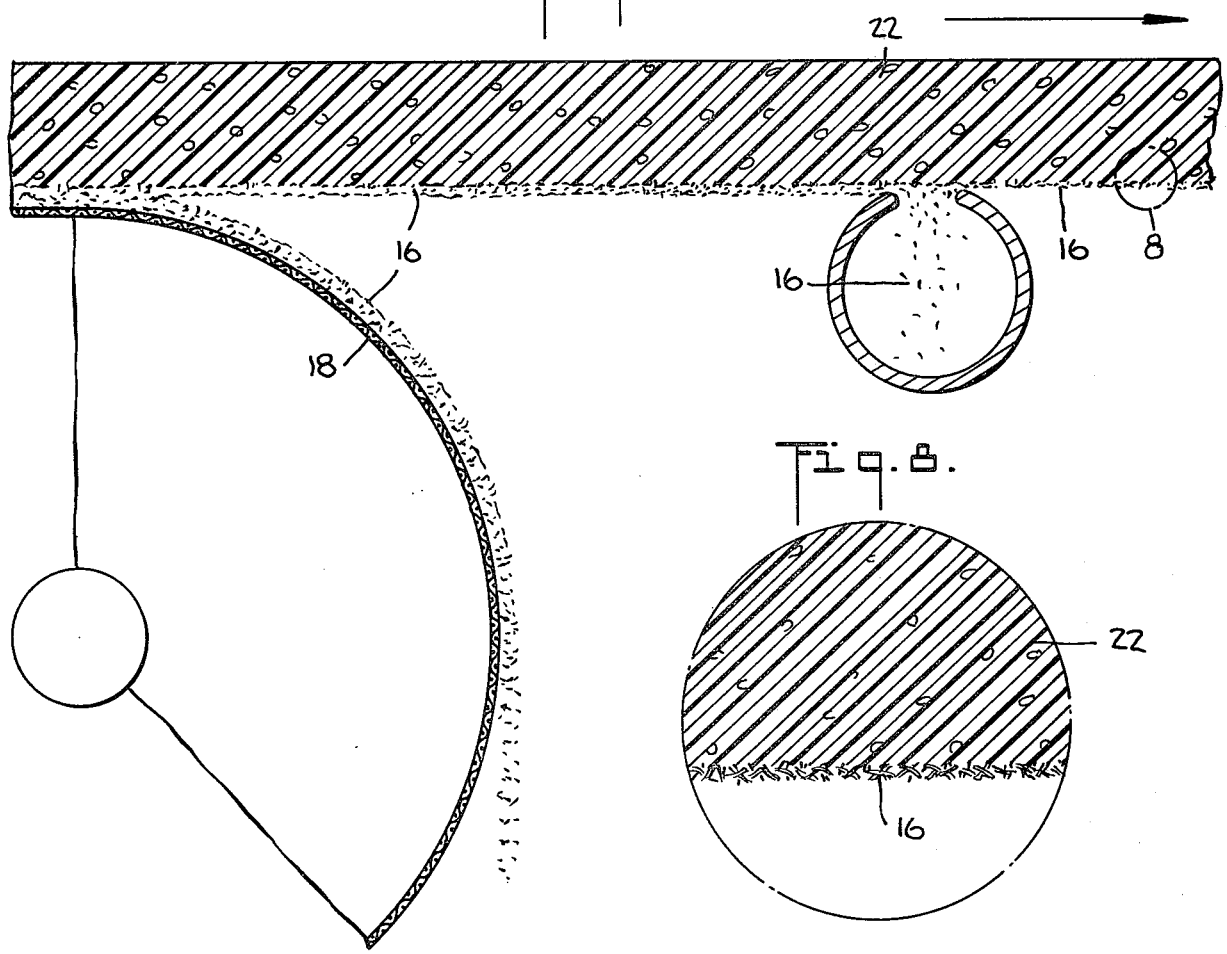
Fig.7.
Fig.8.

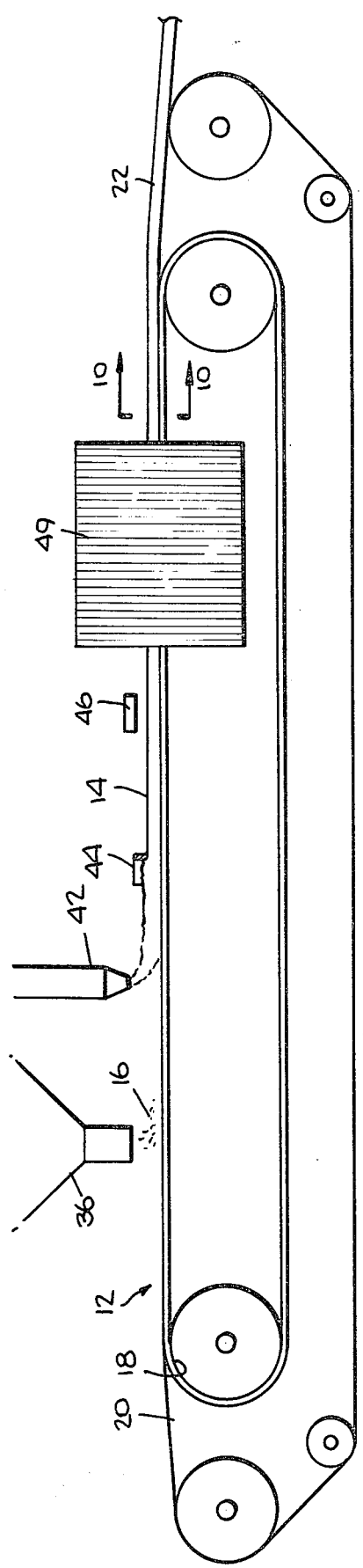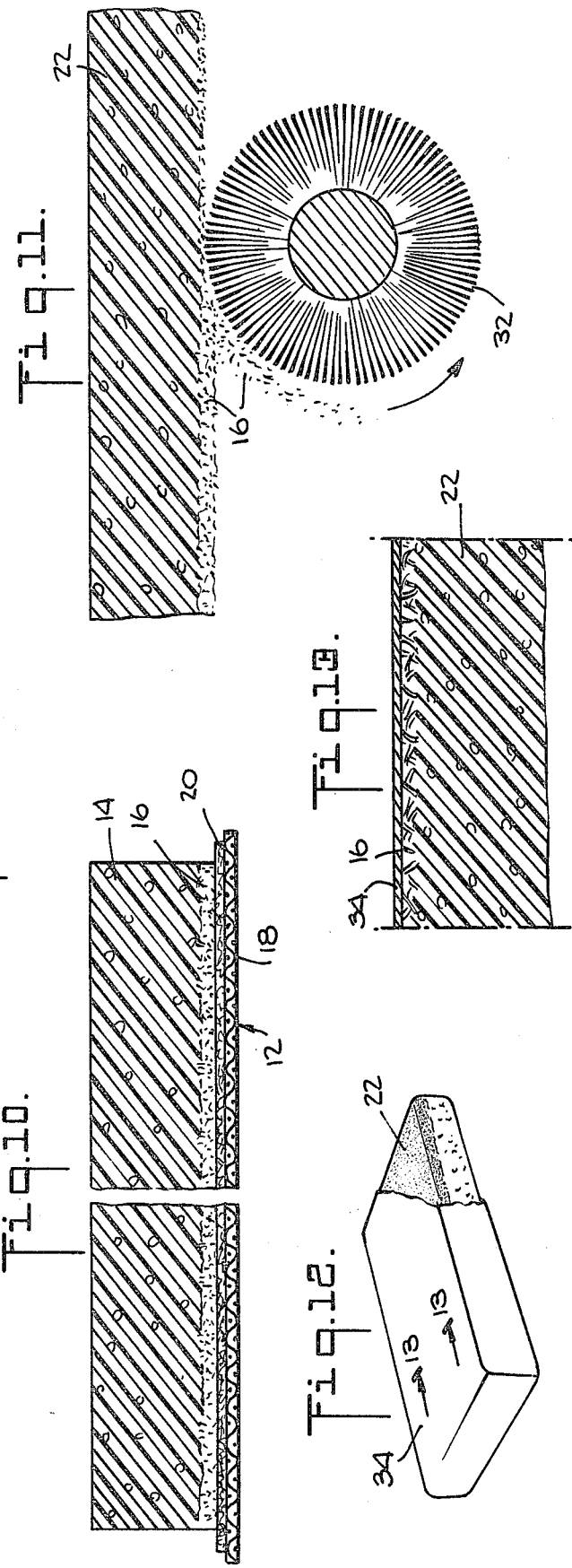

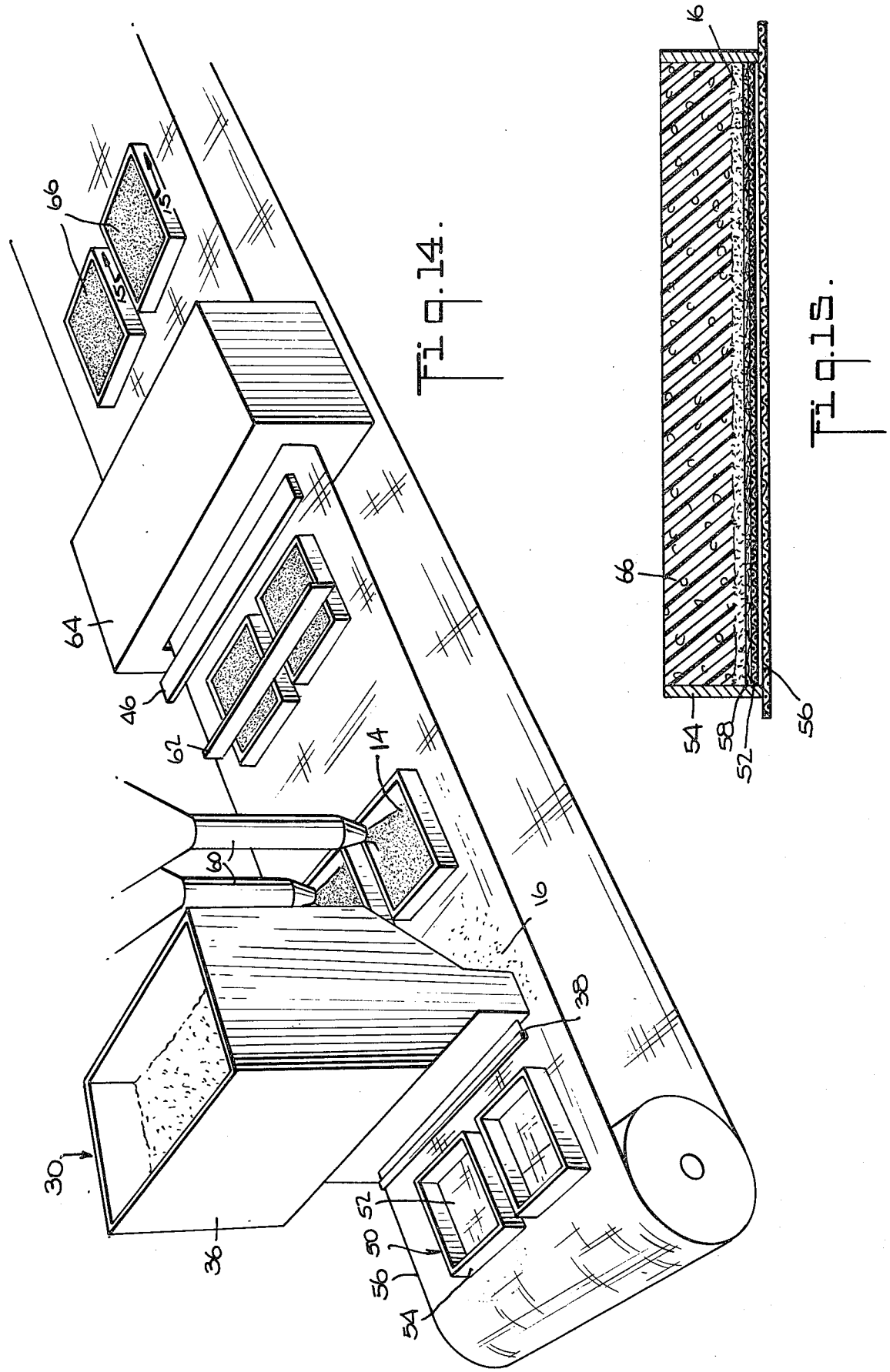

NO-GEL LATEX FOAM MATERIAL AND ITS PREPARATION

This invention relates to latex foams and more particularly to a no-gel latex foam formed free of a stretch restraining backing material.

No-gel latex foams are generally made from an aqueous emulsion or latex of a polymer that is whipped or frothed with a foaming agent and cured in dry heat as disclosed in U.S. Pat. No. Re. 27,366. This is in contrast to gellable foams which contain a gelling agent as disclosed in U.S. Pat. No. 2,706,183 and are cured in the presence of saturated steam, as disclosed in U.S. Pat. No. 3,243,491.

Although the no-gel latex foam froth contains a foaming agent, which helps to maintain the cellular structure of the froth, it has been found that a cure comprising rapid dehydration and heating of the foam froth helps ensure formation of a uniform cell structure in the foam product. A relatively rapid dehydration and cure can be obtained by simultaneously heating and dehydrating a layer of the no-gel latex foam froth through a lower supported surface as well as an upper free surface. To accomplish this the latex froth layer is supported on a water vapor-permeable foraminous support means with a water vapor-permeable liner disposed between the froth and the support means. The liner, which can be a fabric such as nylon, also permits the no-gel latex foam to be easily removed from the support means after curing.

During curing of the foam froth the fabric liner bonds to the latex foam to form an adherent backing that cannot be separated without causing damage to the cured foam. However the presence of such a fabric liner as a backing on the resulting foam is in some instances highly desirable. For example, in the manufacture of automobile trim and seat pads, the foam is covered with an upholstery material that is sewn through the fabric backing which provides a substantial degree of stitch pullout resistance. But the fabric backing can also be an encumbrance since it does not permit free stretching of the foam. In addition the fabric backing can cause discomfort in those applications where the foam is used for cosmetic padding as in brassieres.

It is thus desirable to provide a no-gel latex foam that does not have a stretch restraining fabric liner.

Among the several objects of the invention may be noted the provision of a novel method for making no-gel latex foam free of a stretch restraining backing material, and a novel method of making no-gel latex foam which permits easy release of the foam from a foraminous support. Other objects of the invention are to provide an improved no-gel latex foam construction and in particular a no-gel latex foam construction having a surface with a low coefficient of friction. Other objects and features will be in part apparent and in part pointed out hereinafter.

In accordance with the present invention a foraminous water vapor-permeable supporting means is coated with a flock, and a froth of no-gel polymer latex is deposited onto the support means over the flock. The term flock is intended to include materials comprising fibrous particles and nonfibrous powder particles and the like. The deposited froth is dehydrated and cured and the cured foam is removed from the support means.

The flock coating which is vapor permeable, prevents the latex foam froth from coming into contact with the support means. During curing, the foam froth is dehydrated through its upper free surface as well as the flock engaging lower supported surface. When the cured foam is removed from the support means a portion of flock adheres to the undersurface of the foam and a non-adherent excess portion of flock is left as a residue. Consequently the flock coating functions as a parting layer between the latex foam froth and the supporting means to permit easy release of the cured foam from the supporting means.

The supporting means can comprise an endless conveyor belt for continuous operation of the disclosed method or a peripherally framed foraminous member of finite area for batch operation of this method.

Regardless of whether the foam is produced continuously or in batch fashion the resultant product is characterized by one surface that is substantially smooth and free of congealed polymer skin, and another surface containing an adherent coating of flock. The foam body has a substantially open cell structure.

The invention accordingly comprises the methods and constructions hereinafter described, the scope of the invention being indicated in the following claims.

In the accompanying drawings in which various embodiments of the invention are illustrated:

FIG. 1 is a simplified schematic diagram of an apparatus for carrying out continuous operation of the present invention;

FIGS. 2 through 7 are enlarged sectional views taken along lines 2—2 through 7—7 respectively of FIG. 1;

FIG. 8 is an enlarged view of the fragmentary portion 8 in FIG. 7;

FIG. 9 is a modification of the apparatus of FIG. 1;

FIG. 10 is a sectional view taken along the line 10—10 of FIG. 9;

FIG. 11 is an enlarged fragmentary sectional view of a device for removing unadhered flock from a cured foam sheet;

FIG. 12 is an upholstered seat cushion incorporating one embodiment of the present invention;

FIG. 13 is a sectional view taken along the line 13—13 of FIG. 12;

FIG. 14 is a simplified schematic diagram of an apparatus for carrying out batch operation of the present invention;

FIG. 15 is a sectional view taken along line 15—15 of FIG. 14; and

FIG. 16 is a flow diagram of the invention.

Corresponding reference characters indicate corresponding parts throughout the several views of the drawings.

Figure 1:
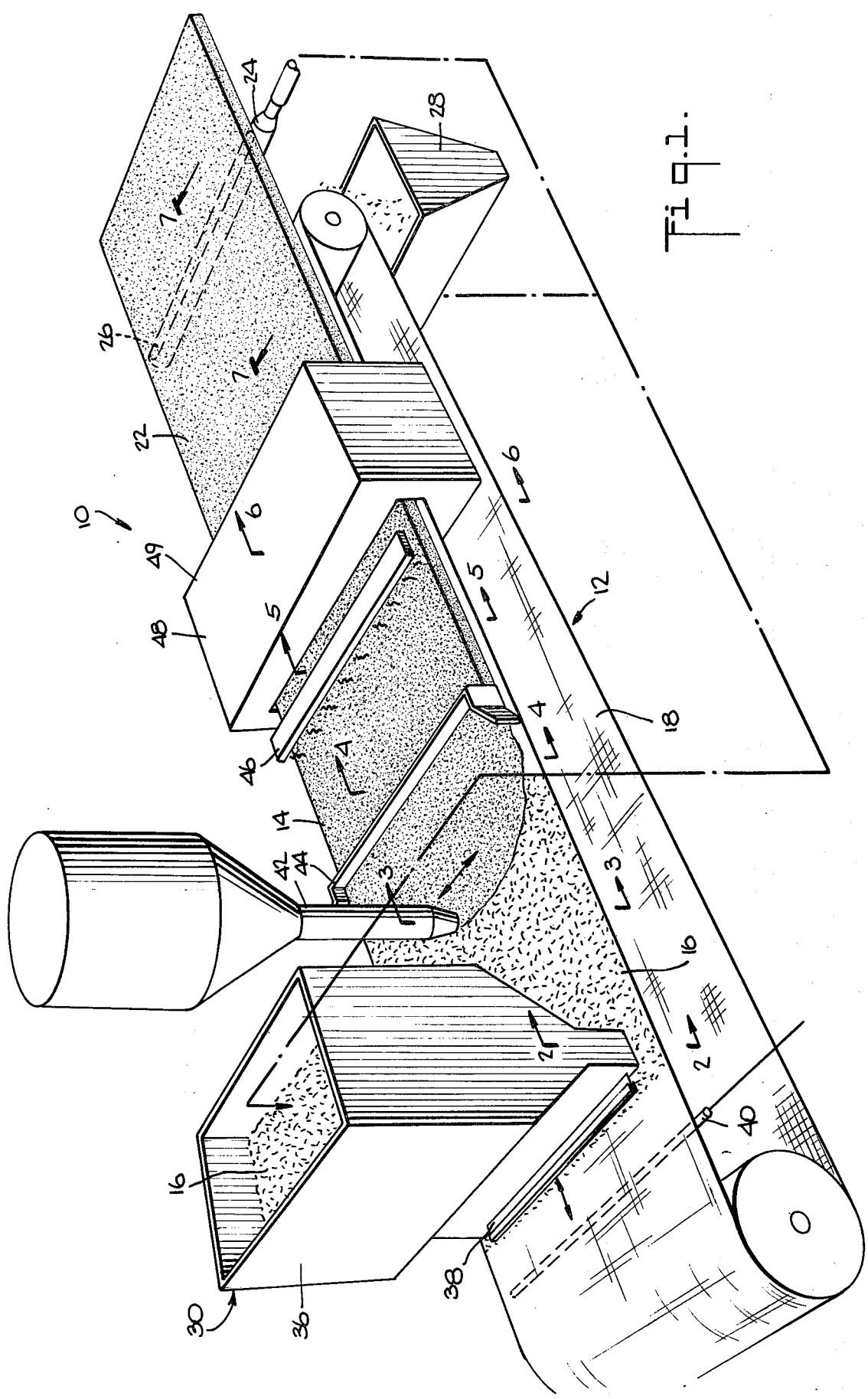
Figure 2:
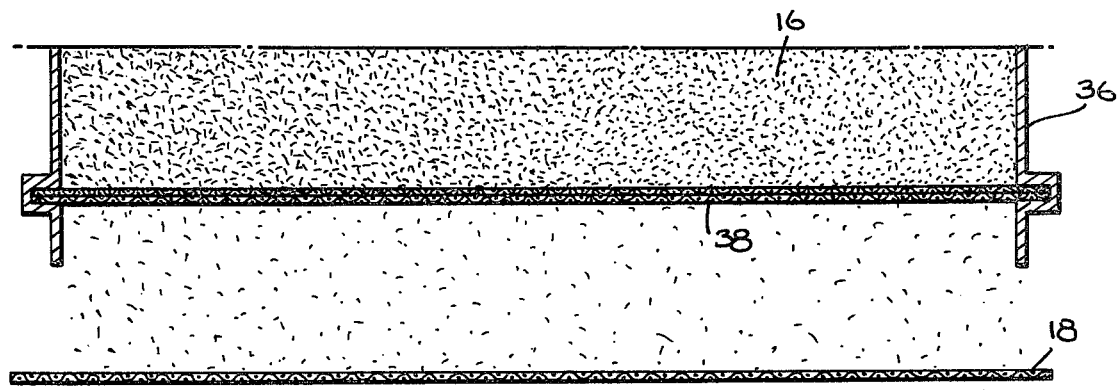
Figure 3:
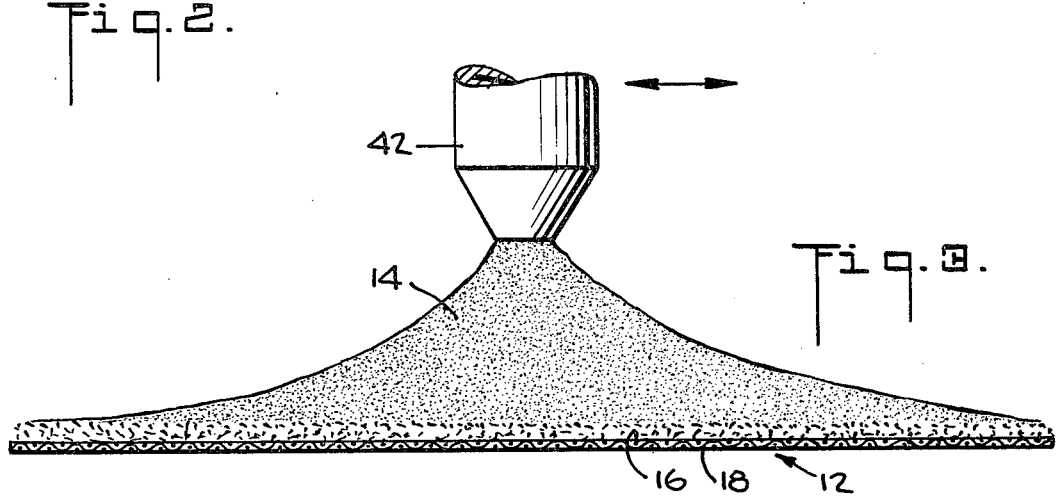
Figure 4:
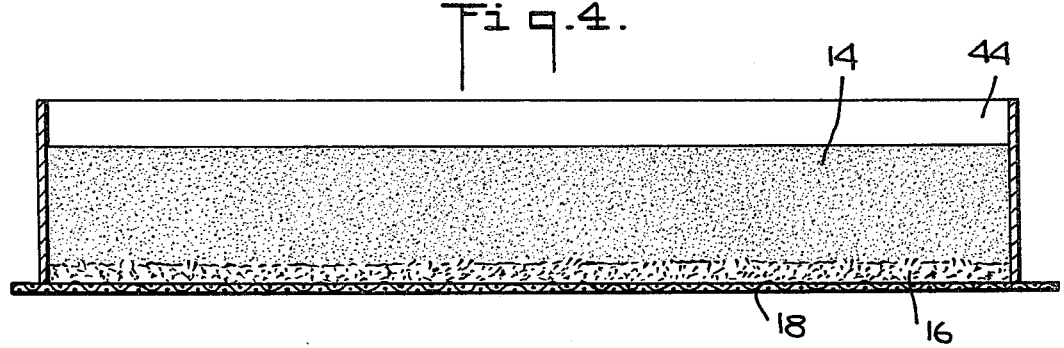

Referring to the drawings for a detailed description of the present invention an apparatus for carrying out continuous operation of the method for making a no-gel latex foam is generally indicated by reference number 10 in FIG. 1.

The apparatus 10 includes a foraminous supporting means 12 upon which a latex foam froth 14 is deposited and upon which a flock 16 is coated prior to deposition of the latex foam froth 14. The supporting means 12 can comprise an endless belt formed of wire mesh driven in a circuitous path such as conveyor belt 18. Any suitable known wire mesh can be used such as National Bureau of Standards (NBS) testing sieves made in accordance with NBS specifications and adopted by the American Society of Testing Materials and the American Standards Association. The sieve mesh selected is generally based on the size of flock being used to prevent the flock from sifting therethrough. The sieve mesh should also be sufficiently open to enable water vapor to escape. For example a rayon flock having fibers approximately 0.030 inches long and 0.0006 inches in diameter can be used with an NBS sieve number 325 having 323 openings per inch each opening being about 0.0017 inches square.

If desired the supporting means 12 can include a nonwoven fabric 20 (FIG. 9) disposed on the conveyor belt 18. The nonwoven fabric 20 can be made, for example, of textile material such as nylon, polyester, rayon, glass or asbestos. The nonwoven fabric 20 is especially permeable to water vapor and withstands the hot moists conditions prevalent during curing of the foam froth. In addition the nonwoven fabric 20 can retain a flock such as cornstarch powder having a size range of about 10–25 microns. The nonwoven fabric 20 also permits use of a conveyor belt 18 having a sieve opening larger than the flock particle size since the fabric 20 is interposed between the conveyor belt 18 and the flock 16 as shown in FIG. 9.

The coating of flock 16 can be formed of any suitable fibrous or powder material. However it is essential that the type of flock used does not react with the latex froth 14 in such a way as to interfere with the cure or adversely affect the development of a satisfactory foam product.

Suitable flock materials can be fibrous particles or nonfibrous powder particles. These include but are not limited to nylon, rayon, cotton, polyester, glass, cornstarch, whiting, zinc oxide and wood flour, which is a pulverized dried wood from either soft or hard wood wastes. The invention also contemplates the use of mixtures of differing flock materials provided there is all around compatability with the flock mixture and the foam.

The coating of flock 16 on the support means 12 must be sufficiently thick to prevent the latex foam froth 14 from contacting the support means 12, yet at the same time must enable water vapor to escape through the support means 12 during dehydration and curing of the foam froth 14. The minimum thickness of the flock coating 16 that will prevent the latex froth 14 from contacting the supporting means 12 can be determined empirically. However it is preferred that the flock coating 16 exceed this minimum thickness to ensure that the latex froth 14 does not contact the supporting means 12. The amount of excess flock used is not critical and can be a matter of choice.

When the cured foam 22 is removed from the support means 12 the flock 16 which has contacted the latex froth 14 adheres to the undersurface of the foam 22 owing to the adhesive nature of the uncured latex 14 (FIG. 8). The excess flock 16, which has not contacted the latex froth 14 after curing, is left as an unadhered residue.

A vacuum tube 24 having a suction slit 26 is disposed under the foam sheet 22 beyond the support means 12. The suction slit 26 extends the width of the foam sheet 22 and draws in any of the excess flock 16 not adhered to the under surface of the foam 22. The collected excess flock 16, including that which falls from the supporting means 12 into a bin 28, can be redeposited into a flock distributor 30 as schematically indicated in FIG. 1. A rotating brush 32 (FIG. 8) or a nonrotating brush (not shown) can be used in place of or in combination with the vacuum tube 24 to remove the excess unadhered flock 16 from the undersurface of the cured foam 22.

The flock 16 thus serves as a parting layer intermediate the cured foam and the supporting means 12 to permit removal of the cured foam from the supporting means 12. The cured foam 22, with the flock backing 16, has unrestricted stretching capability since the flock particles are non-continuous and do not bond to each other.

The choice of flock material is largely dictated by the surface feel of the flock 16 on the cured foam 22 although other characteristics attributable to a particular flock material or mixture can be important in making a selection. For example a no-gel latex foam 22 having flock backing comprised of cornstarch in a size range of about 10–25 microns (Amaizo 100) is particularly useful in automobile seat cushions. The cornstarch has been found to provide a desirable silky finish to the surface of the foam stock, permitting the surface to have a low coefficient of friction. Thus an upholstery material 34 fitted onto the foam 22 adjacent the adhered coating of flock such as cornstarch (FIGS. 12 and 13) can easily shift over the flock when the seat is occupied thereby enhancing overall sitting comfort.

The length of the fiber flock particles can range in size up to one quarter of an inch although lengths exceeding this are also contemplated. However a length of up to one eighth of an inch is considered adequate and shorter length fibers on the order of a few thousandths of an inch are preferred since they generally impart a more desirable texture to the cured foam 22 than would result with larger size particles.

In general most commercially available powder cell sizes are suitable for the purposes of the invention provided that the flock characteristics other than particle size, including resultant surface texture, render the foam and flock combination desirable.

Generally, when the flock material comprises powder, the flock coating is deposited onto the nonwoven fabric 20, and, if desired, fiber particles can also be disposed thereon instead of directly onto the conveyor belt 18.

The flock distributor 30 for dispersing the flock 16 onto the supporting means 12 is of any suitable known structure and comprises a hopper 36 having a movable screen 38 of the suitable mesh size. For example an NBS 100 mesh screen has been found to pass 98% of Amaizo 100 cornstarch having a cell size of 10–25 microns, whereas an NBS 325 mesh screen has been found to pass 92% of the cornstarch.

Although not shown, it is also feasible to provide a flock distributor having a stationary screen with a blade that reciprocates, rotates or otherwise moves over the flock laden screen to cause the flock to pass through the screen mesh. These and other devices for distributing flock are well known and the selection of one versus another is essentially a matter of choice.

Electrostatic charging means schematically indicated by reference number 40 (FIG. 1) can also be used to maintain a charge directly on or in the vicinity of the supporting means 12 to attract the flock 16 and thereby minimize drifting of the flock materials during their deposition onto the supporting means 12. The electrostatic charging means can thus aid in controlling the thickness of the flock coating 16 on the support means 12.

A latex designed for use according to the present invention is formulated of ingredients set forth in the following table:

| Ingredient | Parts by Weight, Dry Basis |
|---|---|
| Styrene-butadiene copolymer, (LPF-3757, Goodyear) | 100.00 |
| Alkylated phenol non-staining anti-oxidant, (NAUGAWHITE, Uniroyal Chemical) | 1.00 |
| Sodium hexametaphosphate (CALGON, Calgon Corp.) | 0.50 |
| N-Octadecyl disodium sulfosuccinate (AEROSOL 18, American Cyanamid Corp.) | 2.50 |
| Sodium salt of sulfate monoester of a mixture of various fatty alcohols, chiefly lauryl alcohol (AQUAREX WAG, DuPont) | 1.14 |
| Dry ground nepheline syenite (MINEX 3, American Syenite Corp.) | 70.0 |
| Alumina trihydrate (HYDRAL 710, Alcoa) | 70.0 |
| Potassium hydroxide | 0.25 |
| Zinc salt of 2-mercantobenzothiazole (OXAF, Uniroyal Chemical) | 1.25 |
| Sulfur | 1.65 |
| Zinc oxide | 1.25 |
| Carbon black - Channel type | 1.10 |
| Zinc diethyl dithiocarbamate, (ETHAZATE, Uniroyal Chemical) | 0.75 |
| Sodium polyacrylate (MODICOL VD, Nopco Chemical) | 0.11 |

The styrene-butadiene rubber (SBR) latex has the following physical properties:
Total solids: 69.5%
pH: 10.2
Surface tension: 33 dynes per cm.
Viscosity (Ambient temperature): 1540 centipoises The SBR latex formulation, without the addition of any gelling agent, is frothed by a suitable known apparatus such as disclosed in U.S. Pat. Nos. 2,695,246, 2,706,108 or 2,731,253. The latex froth 14 is then poured or otherwise deposited onto the supporting means 12 over the flock 16 by a suitable known traversing spout or nozzle 42 such as disclosed in U.S. Pat. No. 2,774,106. A doctoring arrangement 44 can be used, if desired, to facilitate deposition of the latex froth 14 to a uniform thickness on the supporting means 12.

The cell structure of the latex froth 14 is not resistant to collapse despite the presence of foam stabilizers. It is preferable to limit the thickness of the latex froth layer 14 to about 1¼ inches since densification, cell collapse and other similar problems generally become evident in the cured no-gel latex foam when this layer thickness is exceeded. To minimize the possibility of cell collapse or cell densification the foam froth 14, regardless of layer thickness should be dehydrated and cured rapidly and as soon as possible after it has been deposited onto the supporting means 12. However when the latex foam froth 14 is subjected to a rapid cure cycle small fissures or blemishes otherwise known as surface checking (not shown) can form in the foam surface. This condition is not generally objectionable but can be substantially eliminated by preheating the latex froth 14 before subjecting it to a rapid cure.

Figure 5:
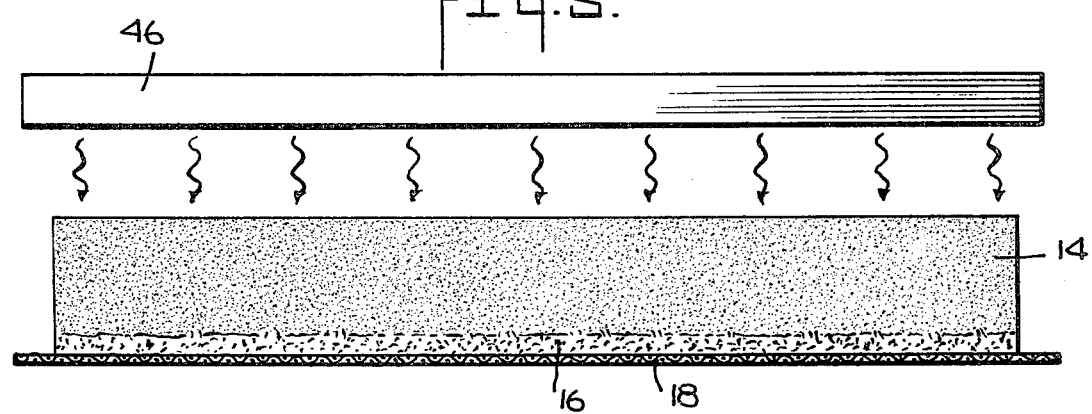
Figure 1B:
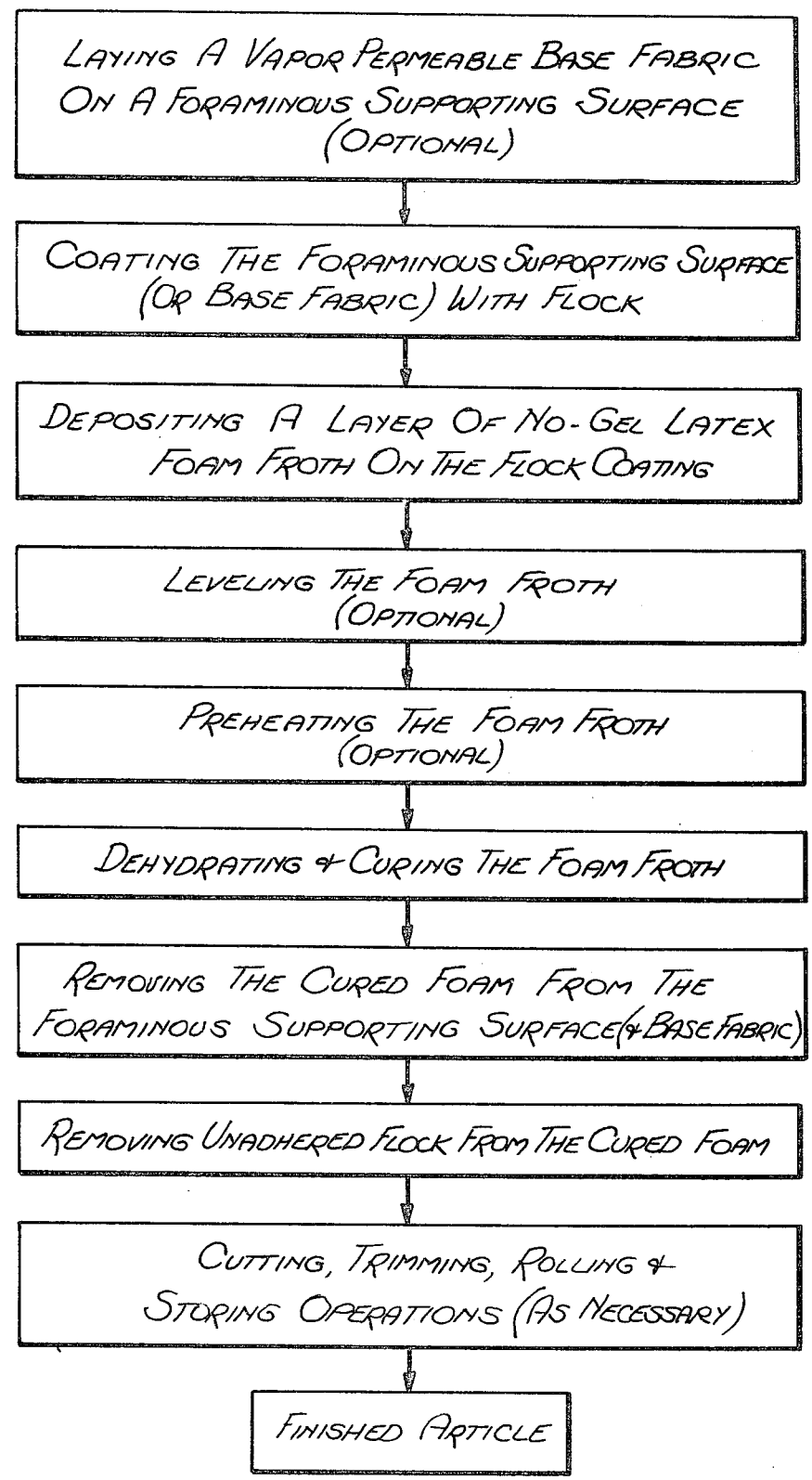

The preheating is preferably accomplished by any suitable known means of radiant heat such as a bank of Calrod heaters 46 (FIGS. 1 and 5) near the support means, preferably directly above the latex foam froth 14 immediately before a curing area 48. The surface temperature of the no-gel latex froth is usually about 70° F. before being preheated and about 200° F. after being preheated by for example a five foot long bank of Calrod heaters 46. The surface temperature rise from 70° F. to 200° F. can occur in a time duration of about 25 seconds to about 200 seconds depending on the composition of the latex, the thickness of the deposited froth layer 14 and the desired density of the cured foam, all of which determine the speed of movement of the conveyor belt 18 past the Calrod heaters 46. For example an SBR latex froth one-half inch thick is preheated for about thirty seconds. The preheating effects a preliminary dehydration of the no-gel latex froth 14 to a depth of approximately 1/16 to ⅛ of an inch from the upper free surface of the froth. In instances where the surface checking is a tolerable condition in the cured foam 22 the preheating step can be eliminated.

The latex froth 14 is then conveyed by the support means 12 to the curing area 48 where it is subjected to substantially dry heat at a temperature which can range between about 260° F. to about 400° F. depending on the composition of the latex, the thickness of the deposited froth layer 14, the desired density of the cured foam and the heat tolerance of the flock coating 16.

The duration of the cure cycle for the no-gel latex foam froth 14 is essentially dependent on the thickness of the no-gel latex foam froth and is not substantially affected by the thickness or composition of the flock coating 16. For example an SBR no-gel latex froth layer ½ inch thick, backed by a cornstarch flock layer 1/32 of an inch thick can be dehydrated and cured at about 350° F. for about 13 minutes and is characterized by the following foam properties:
Density: 3.8 lbs/ft$^3$
Compression: 16 lbs/50 sq. in. (RMA)
Compression Set: 9% (22 hrs. at 158° F.-50% deflection) set calculated on deflected height
Tear: 0.5 lbs/linear inch Although any suitable known curing apparatus can be used, an open-ended tunnel-type hot air oven schematically indicated by reference number 49 is preferred. A relatively rapid cure is accomplished since the heat applied during curing causes the froth 14 to dehydrate at its lower supported surface through the flock 16 and the foraminous supporting means 12 as well as at its upper surface as shown in FIG. 6. The possibility of cell collapse or cell densification in the cured foam 22 is thus minimized.

After the cure cycle is completed the latex foam 22 is conveyed by the support means 12 out of the oven 49 and allowed to cool sufficiently to permit further handling. When the cured foam sheet 22 is removed from the supporting means 12 it is trimmed, cut, rolled, and stored or otherwise handled in preparation for its intended use.

In a similar manner the no-gel latex foam can be formed in a batch method rather than a continuous method as previously described. Accordingly in the batch method a supporting means 50 comprises a foraminous plate or wire screen 52 of finite area bounded by a peripheral frame 54 of any suitable shape and material mounted upon a foraminous conveyor belt 56 similar to the conveyor 18 (FIG. 14). The foraminous supporting means 50 can also include a preshaped nonwoven material 58 (FIG. 15) similar to the nonwoven fabric 20. The supporting means 50 and the exposed portions of the conveyor belt 56 are coated with the flock 16 in the manner previously described. The frame 54, prior to use, is treated with a suitable conventional lubricant or mold release agent such as MR 214 manufactured by Green Chemical Products of Illinois.

A nozzle 60 deposits predetermined amounts of the latex foam froth 14 as previously formulated onto the supporting means 50 over the layer of flock 16 within the confines of the frame 54. The deposited froth is doctored, if desired, by a blade 62 and transported by the conveyor belt 56 into a dry oven 64 similar to the oven 49. This arrangement permits dehydration of the undersurface of the latex foam froth 68 through the flock 16, the nonwoven fabric 58, the wire screen 52 and the conveyor belt 56. Dehydration also occurs at the upper free surface of the latex foam froth 14. Curing times and temperatures are as previously described and if desired, the foam froth can also be preheated by the Calrod heaters 46 as disclosed.

After curing is completed the cured foam 66 is removed from the supporting means 50. The cured foam 66, which is previously indicated, includes an undersurface coated with the flock 16, can be used as is or it can be trimmed or otherwise handled preparatory to formation of a finished article. Since all areas of the conveyor belt 56 are coated with the flock 16 any foam froth 14 inadvertently dropping onto the conveyor belt 56 is backed by the flock 16 and therefore easily removed after curing.

The resultant foam structure produced by the continuous or bath methods is characterized by one surface that is substantially smooth and substantially free of congealed polymer skin, and another surface containing an adherent coating of flock, the particles of which partially penetrate the foam body which has a substantially open cell structure.

As will be apparent to those skilled in the art the disclosed methods can be used with various other no-gel latex formulations. For example latexes based on neoprene, natural rubber and blends of natural rubber can be used to form the no-gel latex foam froth in accordance with the present invention.

An advantage of the present method for forming no-gel latex foam is that the resultant product is free of any stretch restraining fabric backing material and is easily released from the foraminous supporting means after curing. Another advantage is the relative economy of the disclosed methods since the flock materials are generally inexpensive as compared to sheets of fabric backing material. In addition the characteristics of the flock used impart an added versatility to the foam product such as the silky smooth surface of a foam having an adherent coating of cornstarch.

If desired a water vapor permeable fabric liner can be placed onto the froth prior to dehydration and heating thereof. The resultant product would then comprise a cured no-gel latex foam having a fabric liner on one surface and a flock coating such as cornstarch on another surface. The fabric would serve the purpose of providing stitch pullout resistance to an upholstery material covering the flock surface and sewn therethrough.

In view of the above it will be seen that the several objects of the invention are achieved and other advantageous results obtained.

As various changes could be made in the above methods without departing from the scope of the invention it is intended that all matter contained in the above description shall be interpreted as illustrative and not in a limiting sense.

What is claimed is:
1. A method for making no-gel latex foam comprising
   (a) distributing a layer of loosely associated flock onto a water vapor-permeable supporting means,
   (b) deposited a froth of uncured no-gel latex foam onto the supporting means over the flock layer to enable the froth to make surface contact with the layer of loosely associated flock, the supporting means being sufficiently layered with flock to enable the flock to prevent the uncured froth from directly contacting the supporting means through the flock layer,
   (c) heating the latex foam froth to dehydrate, cure and form the no-gel latex foam, and
   (d) separating the foam from the supporting means at the flock layer, the thickness of the flock layer being controlled to permit division of the flock layer into a first portion that is adhered to the separated foam to form an exposed surface coating of flock on the foam due to adhesion between the uncured foam froth and the loosely associated flock in contact with the foam froth, and a second nonadherent portion that remains freely disposed on the supporting means, and wherein the constituents of the foam adhered surface coating of flock are of a size and material that does not prevent the no-gel latex foam from being resiliently stretchable substantially in the same manner as without the flock coating.

2. The method of claim 1 wherein the supporting means is foraminous.

3. The method of claim 2 wherein the supporting means is a conveyor belt.

4. The method of claim 3 wherein the conveyor belt moves in a circuitous path and is in consecutive fashion continuously coated with flock, continuously receives deposition of the foam froth over the flock, and the foam froth is continuously heated to dehydrate, cure and form the no gel latex foam in a continuous sheet.

5. The method of claim 1 wherein the flock is fibrous or powder material.

6. The method of claim 1 wherein the flock composition is selected from the group consisting of nylon, rayon, cotton, polyester, glass, corn starch, whiting, zinc oxide, wood flour and mixtures thereof.

7. The method of claim 6 wherein the flock is a fibrous material whose composition is selected from the group consisting of nylon, rayon, cotton, polyester, glass and mixtures thereof.

8. The method of claim 6 wherein the flock composition is selected from the group consisting of corn starch, whiting, zinc oxide, wood flour and mixtures thereof.

9. The method of claim 1 wherein movement of the flock coating onto the supporting means is controlled by an electrostatic charging means.

10. The method of claim 9 wherein the electrostatic charging means is used to apply a charge to the supporting means to attract the flock to the supporting means.

11. The method of claim 9 wherein the electrostatic charging means is used to maintain a charge near the supporting means to attract the flock to the supporting means.

12. The method of claim 1 wherein said latex froth is based on a copolymer of styrene and butadiene.

13. The method of claim 1 wherein said latex froth is based on a latex of natural rubber or blends of natural rubber latices.

14. The method of claim 1 wherein said latex froth is based on a polymer of neoprene.

15. The method of claim 1 wherein the latex froth is preheated after it is deposited onto the supporting means.

16. The method of claim 15 wherein the latex froth is preheated from a temperature of about 70° F. to about 200° F.

17. The method of claim 16 wherein the duration of preheat is about 25 seconds to about 200 seconds.

18. The method of claim 1 wherein the heating of the latex foam froth is carried out at a temperature range of about 260° F. to about 400° F.

19. The method of claim 1 wherein the heating of the latex foam froth is carried out at a temperature of about 350° F. for about 13 minutes.

20. The method of claim 1 wherein the supporting means include a nonwoven textile backing material onto which the flock is coated.

21. The method of claim 20 wherein the nonwoven textile backing material whose composition is selcted from the group consisting of nylon, polyester rayon, glass and asbestos.

22. A product prepared in accordance with the method of claim 1.

23. A product prepared in accordance with the method of claim 1 wherein the first flock layer portion is adhered to the foam exclusively through a direct bond involving only the foam and the flock.

24. A product prepared in accordance with the method of claim 1 wherein the flock particles of the first flock layer portion partially pentrate the foam at one surface and adhere to said foam exclusively through the partial penetration contact with the foam.

25. A product as claimed in claim 24 wherein the flock coating is cornstarch.

26. A product as claimed in claim 25 wherein a fabric liner is adhered to an opposite surface of the foam.

27. A product as claimed in claim 26 wherein the fabric liner is adhered to the foam exclusively through a direct bond involving only the foam and the fabric liner.

* * * * *

UNITED STATES PATENT AND TRADEMARK OFFICE
CERTIFICATE OF CORRECTION

PATENT NO. : 4,174,415
DATED : November 13, 1979
INVENTOR(S) : Eugene J. Bethe

It is certified that error appears in the above-identified patent and that said Letters Patent are hereby corrected as shown below:

Column 8, line 5, change "deposited" to --depositing--.

Signed and Sealed this

Twenty-second Day of July 1980

[SEAL]

Attest:

SIDNEY A. DIAMOND

Attesting Officer

Commissioner of Patents and Trademarks